(12) United States Patent
Daniels, Jr.

(10) Patent No.: US 8,262,159 B2
(45) Date of Patent: Sep. 11, 2012

(54) TOOLBOX SEAT FOR PICKUP TRUCK BED

(76) Inventor: Frederick Augustus Daniels, Jr., West Columbia, SC (US)

( * ) Notice: Subject to any disclaimer, the term of this patent is extended or adjusted under 35 U.S.C. 154(b) by 179 days.

(21) Appl. No.: 12/831,695

(22) Filed: Jul. 7, 2010

(65) Prior Publication Data

US 2012/0007392 A1   Jan. 12, 2012

(51) Int. Cl.
*A47C 7/62* (2006.01)

(52) U.S. Cl. .... 297/188.09; 297/2; 297/14; 297/188.12; 297/188.2; 224/404; 296/24.1

(58) Field of Classification Search .................. 297/2, 3, 297/14, 188.08, 188.09, 188.1, 188.12, 188.13, 297/188.2, 188.21; 224/404; 296/24.1
See application file for complete search history.

(56) References Cited

U.S. PATENT DOCUMENTS

| | | | | |
|---|---|---|---|---|
| 1,456,247 A | * | 5/1923 | Miller | 224/542 |
| 2,264,744 A | * | 12/1941 | Dunnam | 312/235.4 |
| 2,357,214 A | * | 8/1944 | McDole | 312/235.4 |
| 2,919,169 A | * | 12/1959 | Jackson | 312/235.2 |
| 3,829,151 A | * | 8/1974 | Fellenstein | 296/64 |
| 4,366,998 A | * | 1/1983 | Kaiser | 312/235.1 |
| 4,842,175 A | * | 6/1989 | Towsend | 224/275 |
| 4,911,493 A | | 3/1990 | Muirhead | |
| 4,996,937 A | * | 3/1991 | Niina et al. | 114/144 R |
| 5,029,928 A | | 7/1991 | Huber | |
| 5,215,346 A | * | 6/1993 | Reitzloff et al. | 296/51 |
| 5,299,722 A | * | 4/1994 | Cheney | 224/404 |
| 5,429,265 A | * | 7/1995 | Maire et al. | 220/522 |
| 5,484,092 A | * | 1/1996 | Cheney | 224/404 |
| 5,586,805 A | * | 12/1996 | Rinehart | 297/188.09 |
| 5,597,201 A | * | 1/1997 | Hinze | 297/188.1 |
| 5,697,669 A | * | 12/1997 | Yemini | 297/188.1 |
| 5,727,844 A | * | 3/1998 | O'Quinn et al. | 297/217.1 |
| 6,170,724 B1 | * | 1/2001 | Carter et al. | 224/404 |
| 6,341,817 B1 | * | 1/2002 | Stern-Gonzalez | 297/188.1 |
| 6,364,391 B1 | | 4/2002 | Everett | |
| 6,386,409 B1 | * | 5/2002 | Cheney | 224/404 |
| 6,932,408 B1 | | 8/2005 | Loyd, Jr. et al. | |
| 7,309,106 B2 | * | 12/2007 | Stallman | 297/310 |
| 7,347,477 B2 | | 3/2008 | Carty | |
| 7,681,767 B2 | * | 3/2010 | Cheney | 224/404 |
| 2006/0267393 A1 | | 11/2006 | Benites | |

* cited by examiner

*Primary Examiner* — Laurie Cranmer (74) *Attorney, Agent, or Firm* — Thomas L. Moses; Monahan & Moses, LLC (57) ABSTRACT

A combination toolbox and seating assembly is provided. The toolbox seating assembly is installed in the bed of a pickup truck, wherein the toolbox includes a hinged lid, and wherein a bench style seat may be stored within the lid of the toolbox when not in use, and may be positioned within the upper portion of the toolbox when in use to provide comfortable rearward seating within the bed of the truck.

14 Claims, 8 Drawing Sheets

TOOLBOX SEAT FOR PICKUP TRUCK BED

BACKGROUND OF THE INVENTION

The present invention relates generally to seats installed or positioned in pickup truck beds for outdoor activities, such as pre-game tailgating, hunting, and the like. More specifically, the present invention relates to a combination toolbox and seating arrangement that is installed in the bed of a pickup truck, wherein the toolbox includes a hinged lid, and wherein a bench style seat may be stored within the lid of the toolbox when not in use, and may be positioned within the upper portion of the toolbox when in use to provide comfortable seating within the bed of the truck.

Heretofore, many different seating arrangements have been developed for use in the bed of a pickup truck. U.S. Pat. No. 5,029,928 discloses a pickup truck bed seat assembly that includes a base member, which may be installed in the bed of a pickup truck, and a seat assembly that is removably attached to the base member.

U.S. Pat. No. 5,215,346 is directed to a pickup truck tailgate seating and entertainment system that mounts to an inside surface of a conventional pickup truck tailgate, and includes a seating arrangement in combination with a sound system, food container, umbrella holder, and a cover to protect the assembly when not in use.

U.S. Pat. No. 6,364,391 discloses a hinged tailgate assembly, which includes a seating arrangement in combination with a table. Another patent, U.S. Pat. No. 6,932,408 describes an adjustable frame with a seat for a pickup truck bed, wherein the frame includes telescoping adjustment means to allow the frame to fit in a variety of sizes of pickup truck beds. U.S. Pat. No. 7,347,477 discloses a collapsible seating apparatus that is adapted to fit in the bed of a pickup truck. U.S. Pat. No. 4,911,493 is directed to an assembly for installation in the cargo compartment of a light pickup truck consisting of an inner cargo liner insert and rear facing seat combination with two armrests that are designed to cover the two wheelwells.

None of the prior art, however, discloses a seating arrangement in combination with an installed toolbox, wherein the seat bench may be stored within the lid of the toolbox when not in use, and which utilizes the toolbox itself as the base of the seat when the bench seat is in use.

BRIEF SUMMARY OF THE INVENTION

In accordance with one aspect of the invention, a bench seat for use in combination with a toolbox installed in the bed of a pickup truck is provided. The bench seat, when not in use, is removably stored in the lid of the toolbox, which allows a user to maintain access to the inside of the toolbox. In use, the bench seat may be removed from the lid of the toolbox and placed into the opening of the toolbox, so that a user can sit on the bench seat on top of the toolbox while the lid of the toolbox is open.

In a first embodiment, the bench seat may include attachment means, such as snap fit means, on an upper side or an underside thereof, and the underside of the toolbox lid includes corresponding attachment means. This arrangement allows the bench seat to be removably attached to the underside of the toolbox lid. When a user desires to utilize the bench seat, he or she simply opens the lid of the toolbox, removes the bench seat from the underside of the toolbox lid, and places the bench seat directly into the opening of the toolbox. Pickup bed toolboxes that are installed in the bed of a pickup truck directly behind the cab are widely available and in use currently, and most such toolboxes include extended lips on either side thereof, which extend above the sides of the pickup truck bed. In one embodiment, the bench seat may be formed so that it is supported on either side by the extended lips, which maintain the position of the bench seat at the top of the toolbox for seating purposes.

In a second embodiment, the bench seat may be attached to the toolbox by using a hinge means. Preferably, the toolbox lid and the bench seat each may pivot or rotate about a common rod, which serves as the hinge means for both components.

This arrangement provides a rear-facing bench seat that is protected within the toolbox when not in use, and may be secured therein when the toolbox is locked. Additionally, the bench seat is available at all times, so that it may be used during outdoor events at a moment's notice, without having to plan ahead and pack seating means prior to the event.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
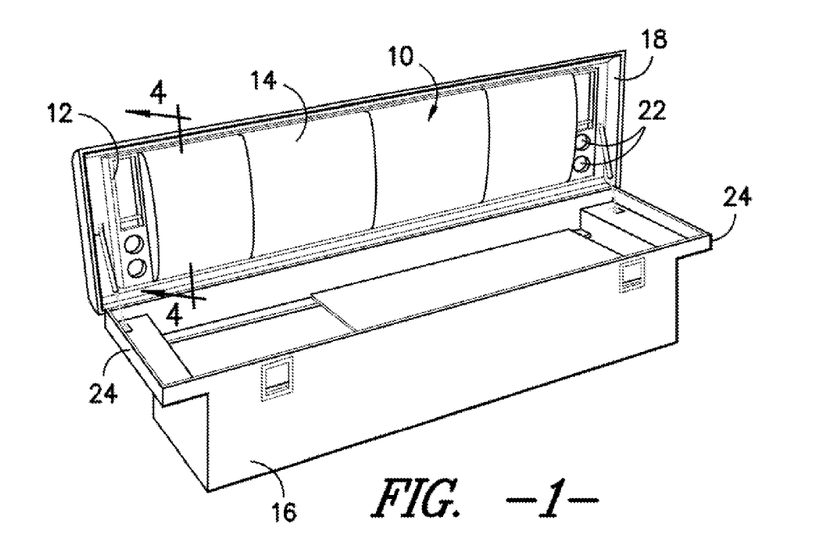
FIG. 1 is a perspective view of one embodiment of a bench seat that is removably attached to an underside of a toolbox that may be installed in a bed of a pickup truck.
Figure 2:
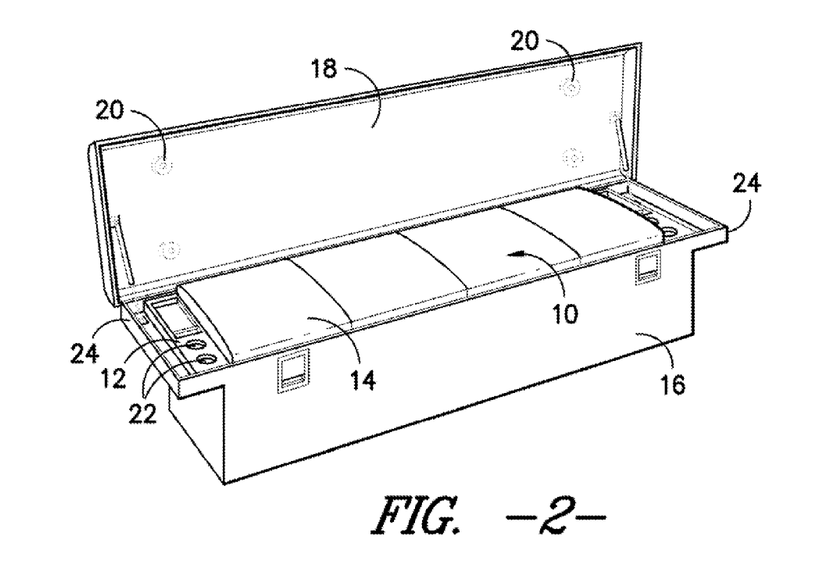
FIG. 2 is a perspective view of one embodiment of a bench seat that is positioned within an upper portion of a toolbox that may be installed in a bed of a pickup truck.
Figure 4:
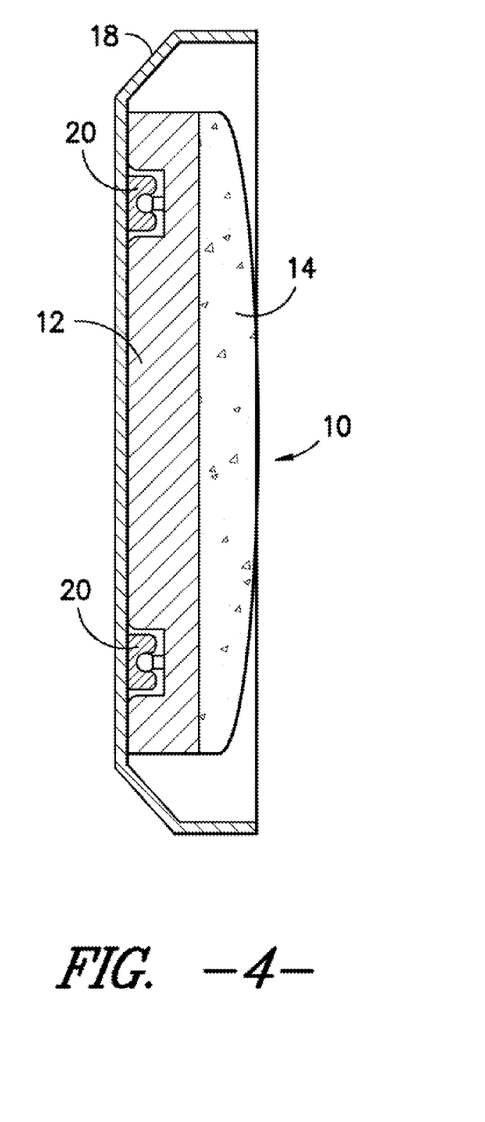
FIG. 4 is a cross sectional view along the lines 4-4 of FIG. 1, showing a bench seat that is removably attached to an underside of a toolbox, and illustrates one embodiment of snap fit attachment means used for removable attachment.
Figure 5:
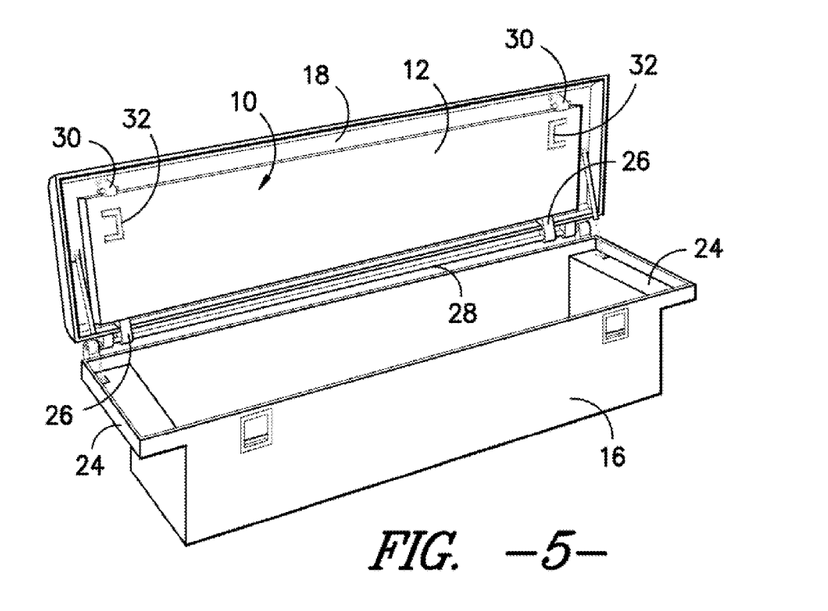
FIG. 5 is a perspective view of another embodiment of a bench seat that is pivotally attached to a toolbox and a toolbox lid via hinge means, wherein the bench seat is in a storage position beneath an underside of the toolbox lid.
Figure 6:
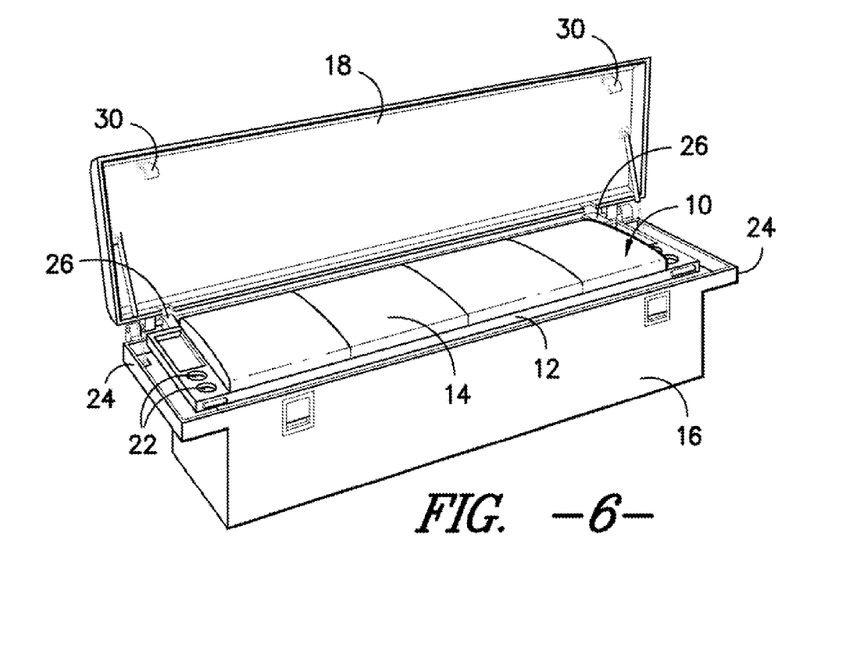
FIG. 6 is a perspective view of the embodiment of a bench seat shown in FIG. 5, wherein the bench seat is in a usable seating position disposed within an upper opening of toolbox.
Figure 7:
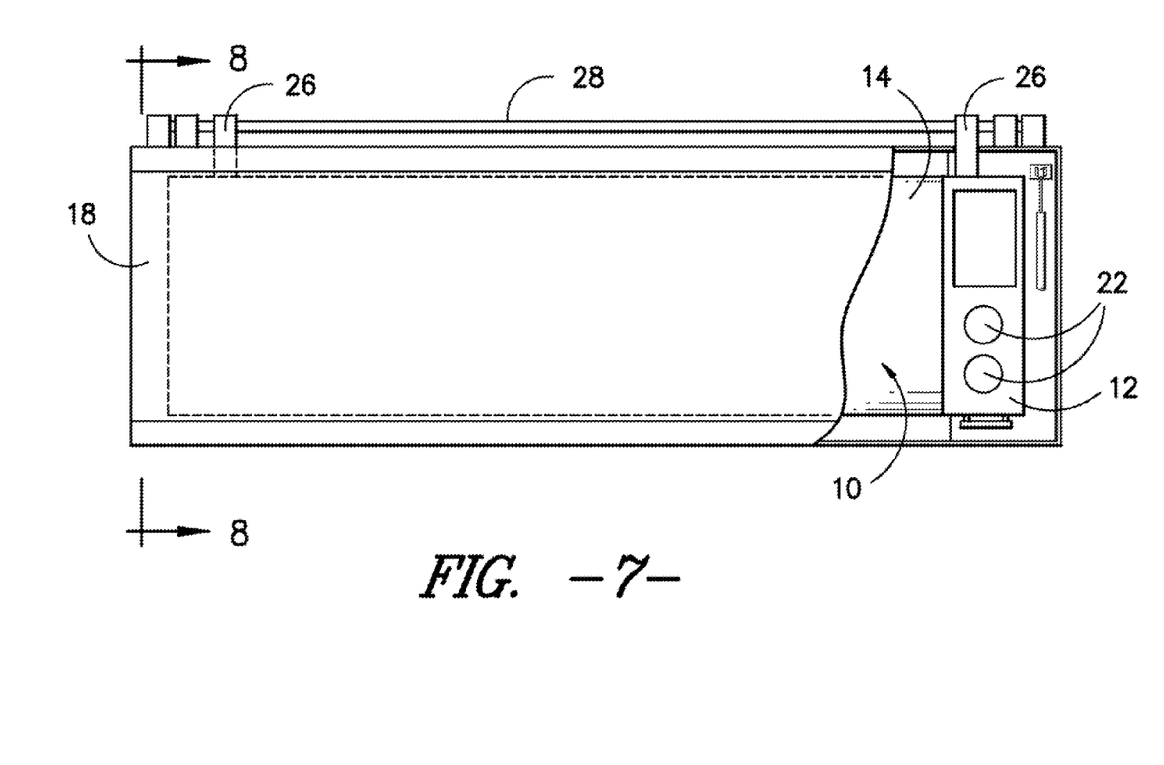
FIG. 7 is a top cutaway view of the embodiment of a bench seat shown in FIG. 5, wherein the hinged bench seat is disposed beneath a closed toolbox lid in accordance with the invention.
Figure 8:
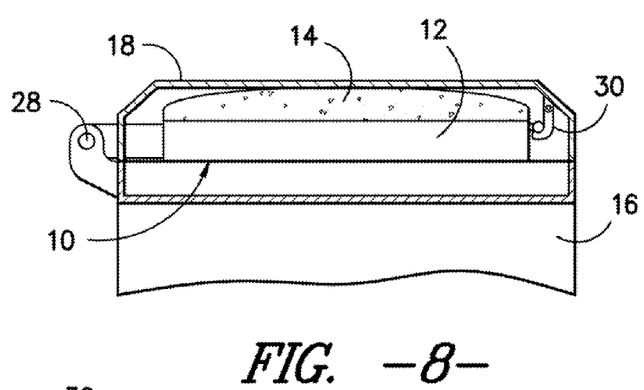
FIG. 8 is a cross-sectional view along the lines 8-8 of FIG. 7, showing the hinged bench seat disposed within a closed toolbox lid.
Figure 9:
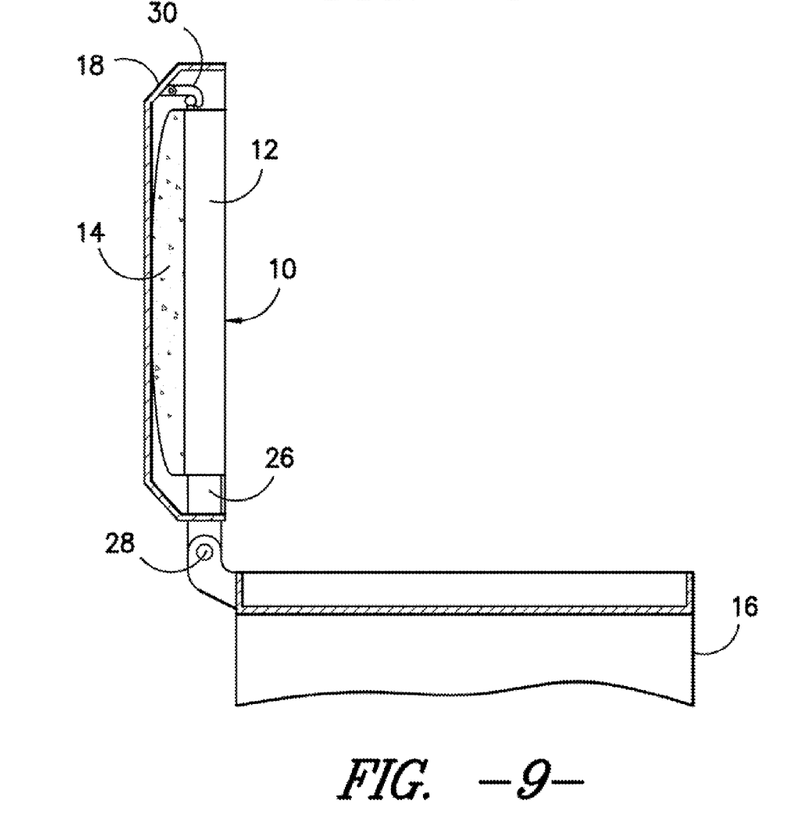
FIG. 9 is a cross-sectional view of the embodiment shown in FIG. 8, showing the hinged bench seat disposed within an open toolbox lid.
Figure 10:
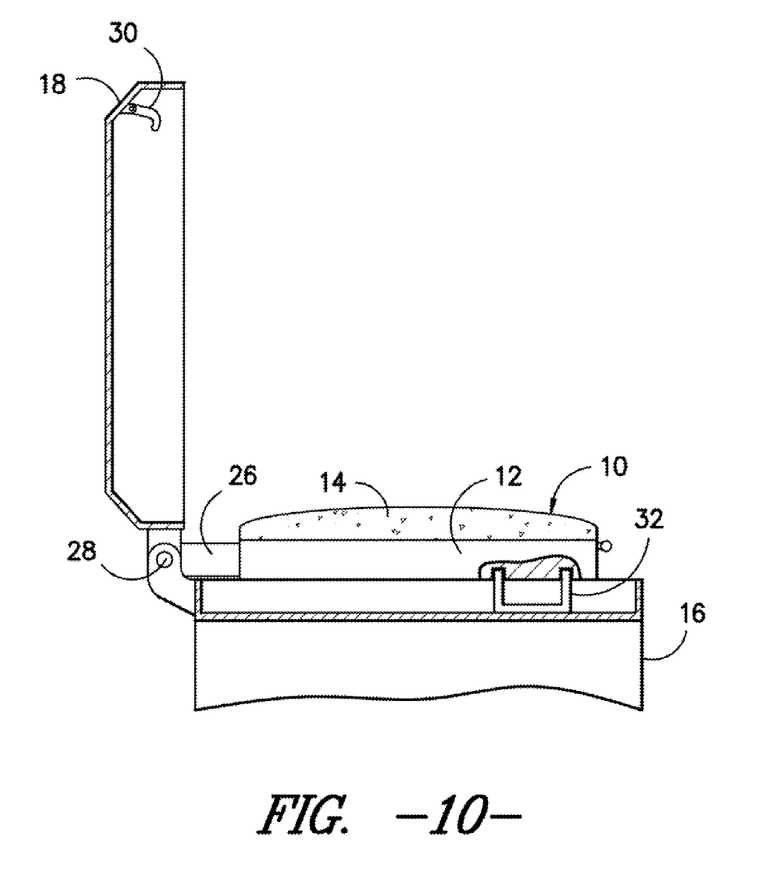
FIG. 10 is a cross-sectional view of the embodiment shown in FIG. 8, showing the hinged bench seat disposed in a horizontal seating position while the toolbox lid is in an open position.
Figure 11:
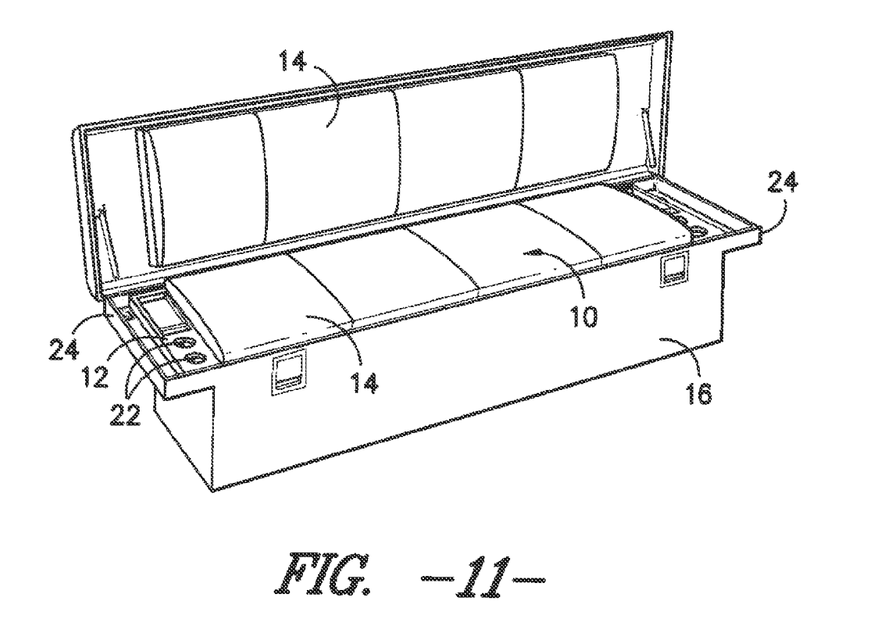
FIG. 11 is a perspective view of one embodiment of a bench seat attached to a toolbox in accordance with one aspect of the invention, wherein a cushion member is attached to an underside of the toolbox lid.

The present invention includes, in a first embodiment, a bench seat 10 comprising a frame member 12 and a cushion member 14. The bench seat is adapted for use in combination with a common toolbox 16 that is mounted or installed in the bed of a pickup truck. Such toolboxes 16 are widely used, and include a hinged lid 18 that typically includes a latch member and a locking means. The bench seat 10, in this embodiment, may be removably stored within the underside of a lid 18 of a toolbox 16 when not in use, as shown in FIG. 1, which allows a user to have easy access to the inside of the toolbox 16. For seating purposes, the bench seat 10 may be removed from the underside of the toolbox lid 18 and placed horizontally within and across an upper portion of the opening of the toolbox 16, as shown in FIG. 2. Preferably, snap fit attachment means 20 are positioned on an underside of the bench seat frame 12, and correspond with snap fit attachment means 20 on the underside of the toolbox lid 18, as shown in FIG. 4. It should be understood that other types of attachment means may be employed to hold the bench seat 10 on the underside of the toolbox lid 18 when the bench seat is not in use, and it is contemplated that the attachment means may be positioned on an upper portion of the bench seat frame member 12, as well as the underside thereof, as shown.

Figure 3:
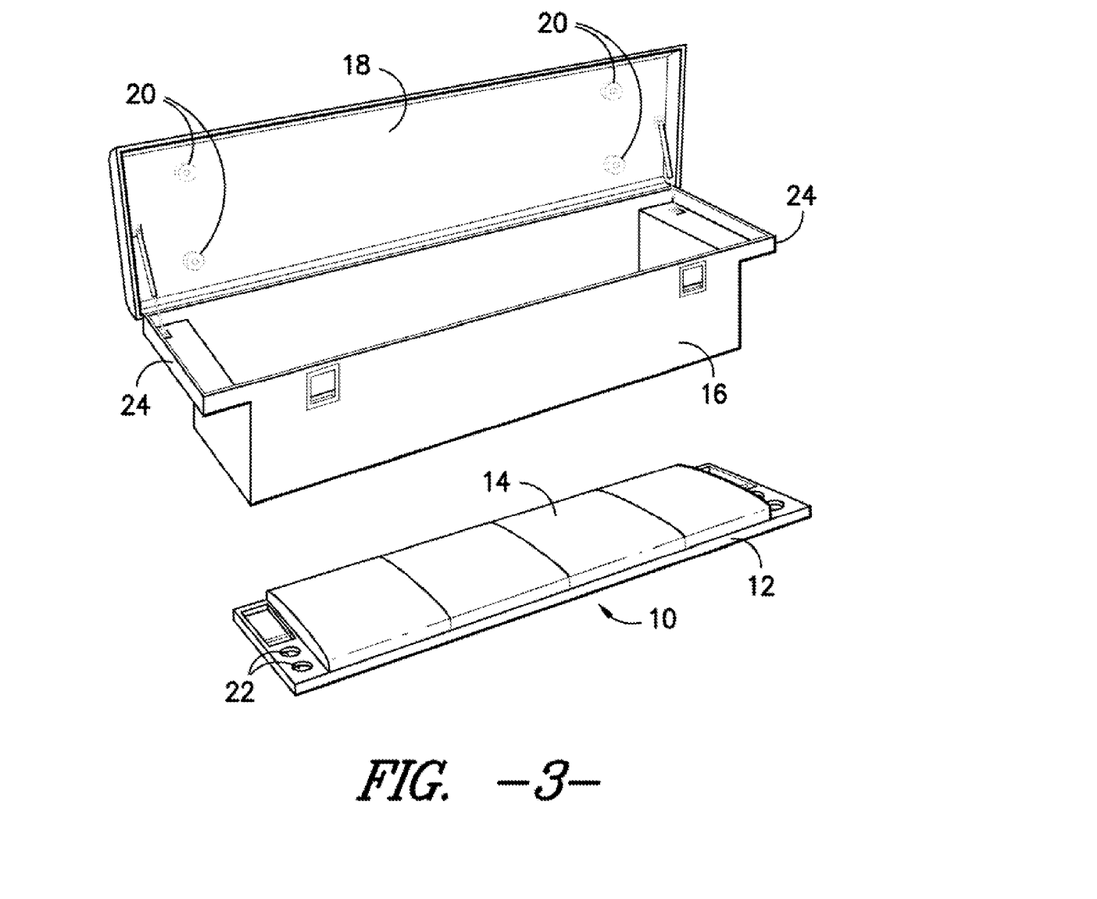
FIG. 3 is a perspective view of one embodiment of a bench seat that may be removably stored on an underside of a toolbox lid.

The frame 12 of the bench seat 10 may include optional features, such as cup holders 22 (as shown in FIGS. 1-3) or handles, in order to facilitate removal and replacement of the bench seat 10 into the storage position or the seating position. The frame 12 may be manufactured using any suitable material, including strong plastics or metal, and the cushions 14 may also be manufactured from any suitable material. Optionally, a second cushion member may also be attached to the underside of the lid 18, which may serve as a backrest when the bench seat is in use, so long as the second cushion member does not interfere with the attachment means 20 between the bench seat 10 and the underside of the toolbox lid 18.

When a user desires to utilize the bench seat 10, he or she simply opens the lid 18 of the toolbox 16, removes the bench seat 10 from the underside of the toolbox lid 18, and places the bench seat 10 directly into the opening at the top of the toolbox 16. Pickup bed toolboxes 16 that are installed in the bed of a pickup truck directly behind the cab are widely available and in use currently, and most such toolboxes 16 include extended lips 24 on either side thereof, which extend above the sides of the pickup truck bed. In one embodiment, the bench seat 10 may be formed so that it is supported on either side by the extended lips 24, which maintain the position of the bench seat 10 at the top of the toolbox 16 for seating purposes.

It is contemplated that this embodiment of the bench seat assembly 10 may be sold as an aftermarket item, and may be installed into pre-existing toolbox lids 18 by simply installing the attachment means 20 to the underside of the toolbox lid 18. The bench seat frame 12 is thus formed to fit into the opening of the existing toolbox 16 so that it is supported by the toolbox 16 itself when the lid 18 is in an open position.

In a second embodiment, the bench seat 10 may be attached to the toolbox 16 by using a hinge means 26. Preferably, the toolbox lid 18 and the bench seat 10 each may pivot or rotate about a common rod 28, which serves as the hinge means for both components, as shown in FIGS. 5-10. In this embodiment, a latch means 30 is used to secure the free swinging side (non-hinged side) to the underside of the toolbox. It should be understood that other pivoting means or hinge assemblies may be employed, so long as the bench seat 10 may pivot between a storage position adjacent the underside of the toolbox lid 18 and a horizontal seating position within and across an upper, open portion of the toolbox 16 as shown. Optionally, the underside of the bench seat frame 12 in this embodiment may include pivoting supports 32 that are used when the bench seat 10 is in the seating position, where the supports 32 may pivot downwardly into a support position in contact with the toolbox 16 in order to support the weight of a person sitting on the bench seat 10. Such supports may be slidable, pivoting, or fixed.

It is further contemplated that the toolbox seat assembly may incorporate electrical or hydraulic means for opening the lid of the toolbox, positioning the hinged bench seat in a storage or seating position, and that a remote control could be incorporated to operate such a system.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What I claim is:

1. A toolbox seat assembly comprising:
    a toolbox having a hinged lid;
    a bench seat including a frame member and a first cushion member disposed on an upper side of said frame member and a pair of handles disposed on an upper portion of said frame member;
    removable attachment means disposed on said frame member for attachment of said bench seat to an underside of said hinged lid;
    wherein said bench seat is adapted to be detached from said hinged lid and placed into an opening of said toolbox to provide a cushioned seat when said hinged lid is in an open position.

2. The toolbox seat assembly set forth in claim 1, wherein said attachment means are disposed on an underside of said frame member.

3. The toolbox seat assembly set forth in claim 1, wherein said toolbox is mounted in a bed or cargo area of a vehicle.

4. The toolbox seat assembly set forth in claim 1, wherein said frame member also includes a cupholder.

5. The toolbox seat assembly set forth in claim 1, wherein said attachment means includes a snap fit assembly.

6. The toolbox seat assembly set forth in claim 1, further including a second cushion member attached to said underside of said hinged lid.

7. The toolbox seat assembly set forth in claim 1, further including a second cushion member attached to an underside of said hinged lid.

8. A toolbox seat assembly comprising:
    a toolbox having a hinged lid;
    a bench seat including a frame member and a first cushion member disposed on an upper side of said frame member, wherein said frame member is pivotally attached to said toolbox, so that when said hinged lid is in an open position, said bench seat may pivot between a storage position adjacent an underside of said hinged lid and a seating position within an open upper portion of said toolbox; and
    wherein said hinged lid and said frame member both pivot about a common rod member that is attached to said toolbox.

9. The toolbox seat assembly set forth in claim 8, wherein said toolbox is mounted in a bed or cargo area of a vehicle.

10. The toolbox seat assembly set forth in claim 8, wherein said frame member also includes a cupholder.

11. The toolbox seat assembly set forth in claim 8, further including a second cushion member attached to said underside of said hinged lid.

12. A toolbox seat assembly comprising:
a toolbox having a hinged lid; and
a seat including a frame member and a first cushion member disposed on an upper side of said frame member, said frame member further including a cupholder;
wherein said seat is adapted to be received across an upper portion of said toolbox in a horizontal orientation for seating purposes, and wherein said seat may be removed from said toolbox in order to provide access to said toolbox.

13. The toolbox seat assembly set forth in claim 12, wherein said toolbox is mounted in a bed or cargo area of a vehicle.

14. The toolbox seat assembly set forth in claim 12, wherein said frame member also includes a pair of handles disposed on an upper portion thereof.

* * * * *